United States Patent [19] [11] 4,001,509
McDonald et al. [45] Jan. 4, 1977

[54] REMOTE OFFICE MESSAGE METERING SYSTEM

[75] Inventors: John C. McDonald, Los Altos; Gary C. Henrickson, Palo Alto; Alan K. Taylor; William A. Settle, both of San Jose, all of Calif.

[73] Assignee: TRW, Inc., Los Angeles, Calif.

[22] Filed: Jan. 30, 1975

[21] Appl. No.: 545,489

[52] U.S. Cl. .............................. 179/7.1 R; 179/7 R
[51] Int. Cl.² ...................................... H04M 15/12
[58] Field of Search ........... 179/7 R, 7.1 R, 7.1 TP, 179/7 MM, 8 R

[56] References Cited
UNITED STATES PATENTS

| 3,312,947 | 4/1967 | Raspanti | 179/7 R |
| 3,626,099 | 12/1971 | Le Bellec | 179/7 R |
| 3,673,333 | 6/1972 | Le Strat et al. | 179/7 R |
| 3,829,617 | 8/1974 | Caithamer et al. | 179/7.1 R |
| 3,870,824 | 3/1975 | Baichtal et al. | 179/7 R |

Primary Examiner—Kathleen H. Claffy
Assistant Examiner—Gerald L. Brigance
Attorney, Agent, or Firm—Flehr, Hohbach, Test, Albritton & Herbert

[57] ABSTRACT

A local message metering system for metering each subscriber's use of a telephone system. Scanner banks periodically address the subscriber circuits to store data about subscriber usage in scanner bank adapters. One or more remote tributary offices are connected to a recording office over data links which connect to the scanner bank adapters. Single channel and redundant, two-channel data links are employed. Redundant channels are controlled by interlocked control networks. The data links are controlled by data transmitters and data receivers. The data receivers are addressed along with the scanner bank adapters to transfer data over data paths to external storage units. Redundant data paths are controlled by interlocked control networks. The redundant data links operate independently of the redundant data paths.

25 Claims, 10 Drawing Figures

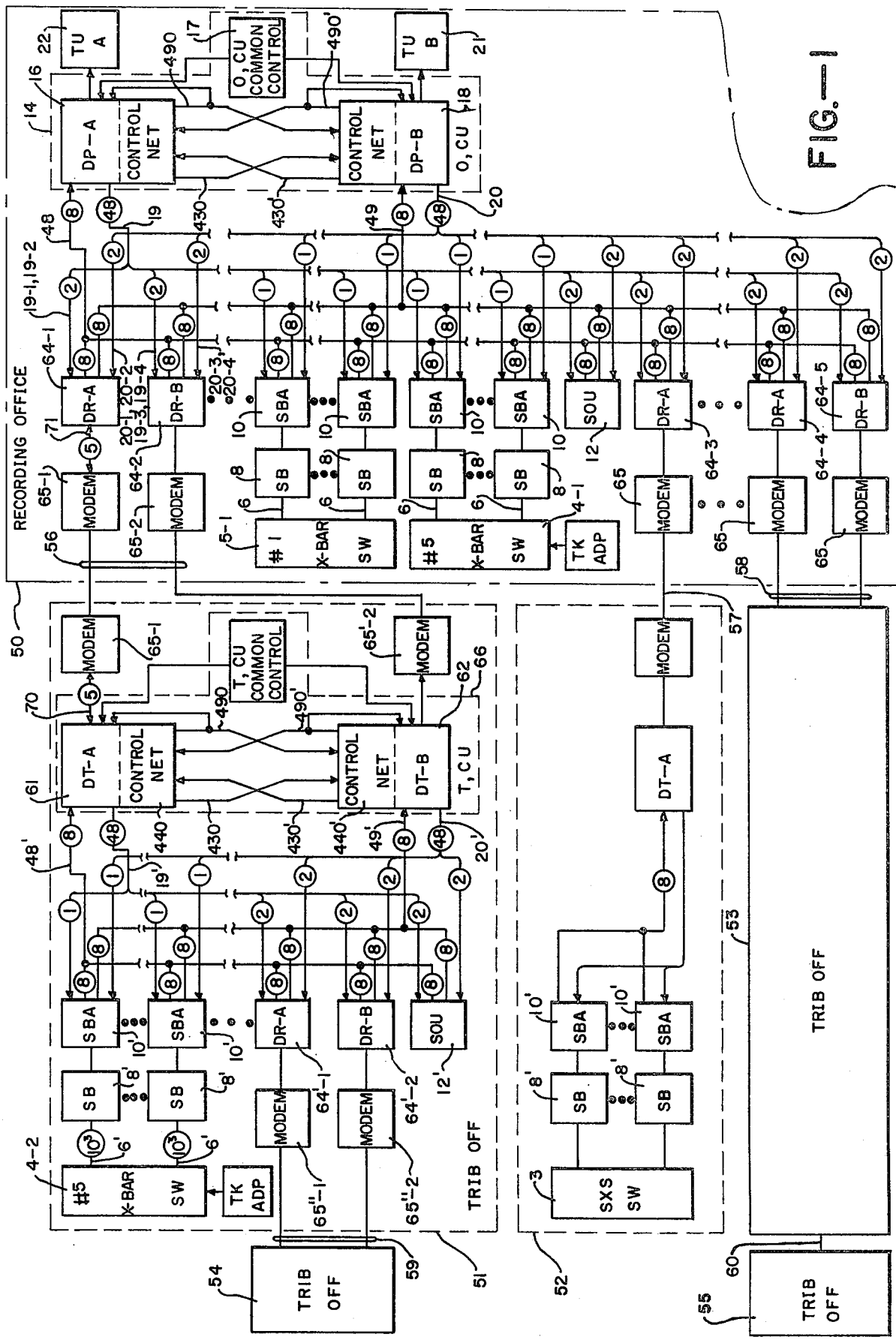
FIG.—1

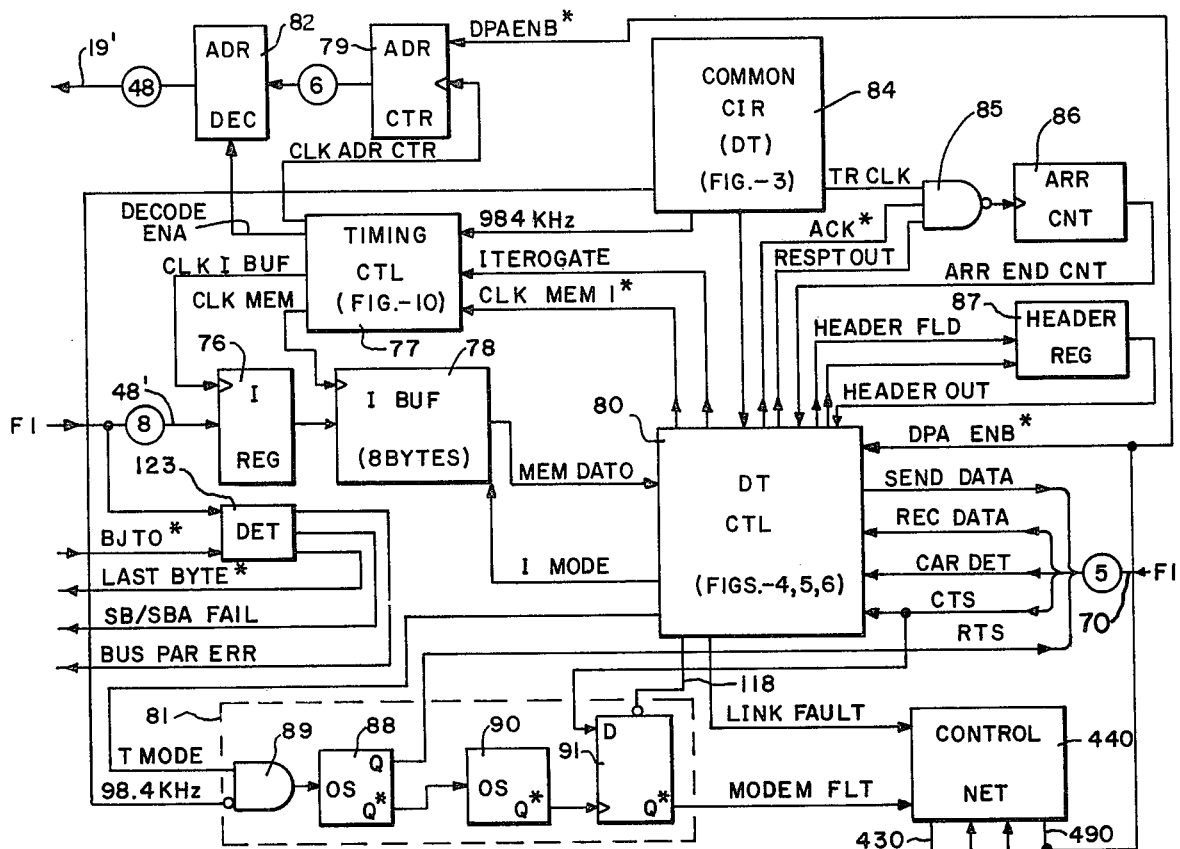
FIG.—2
FIG.—3

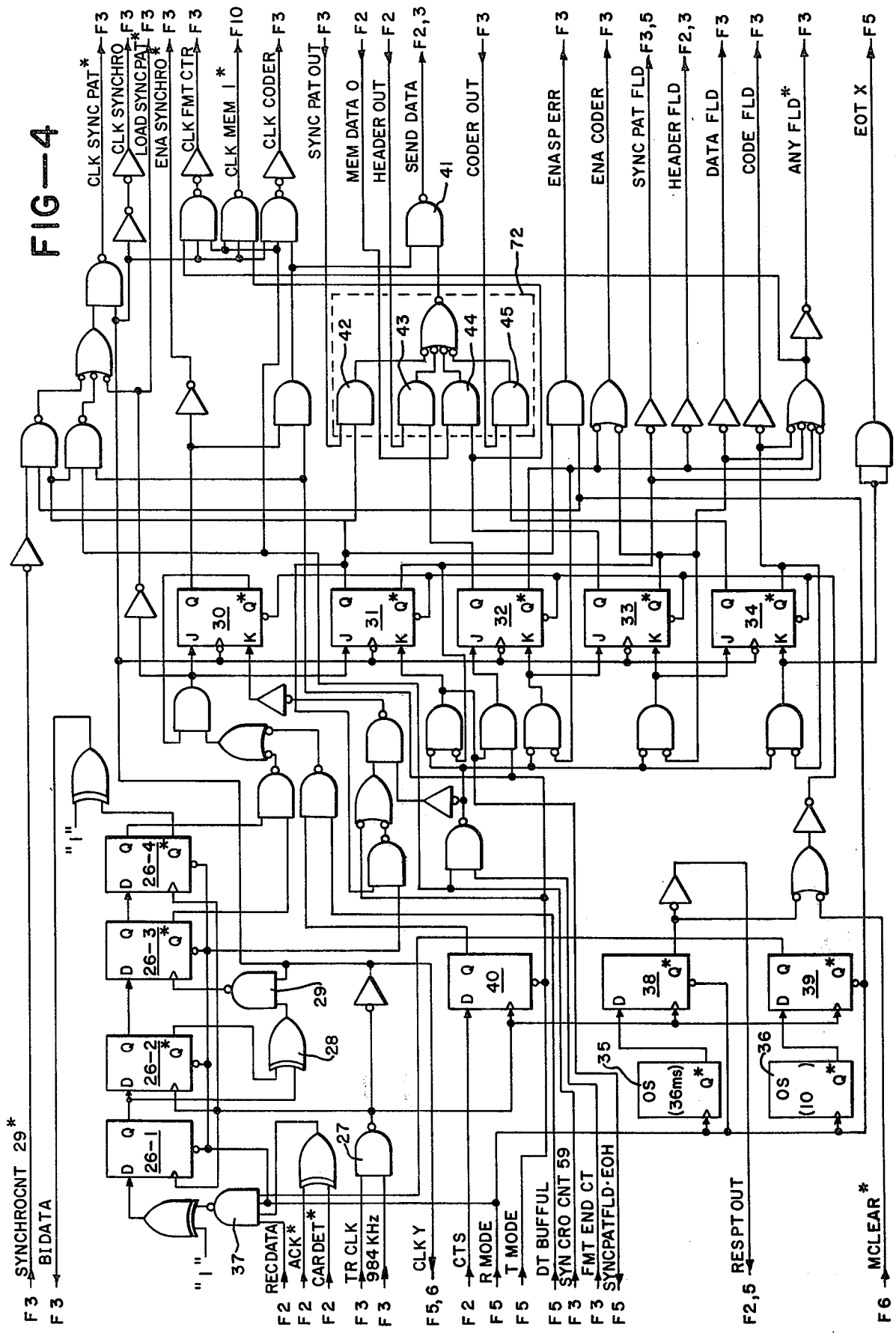
FIG—4

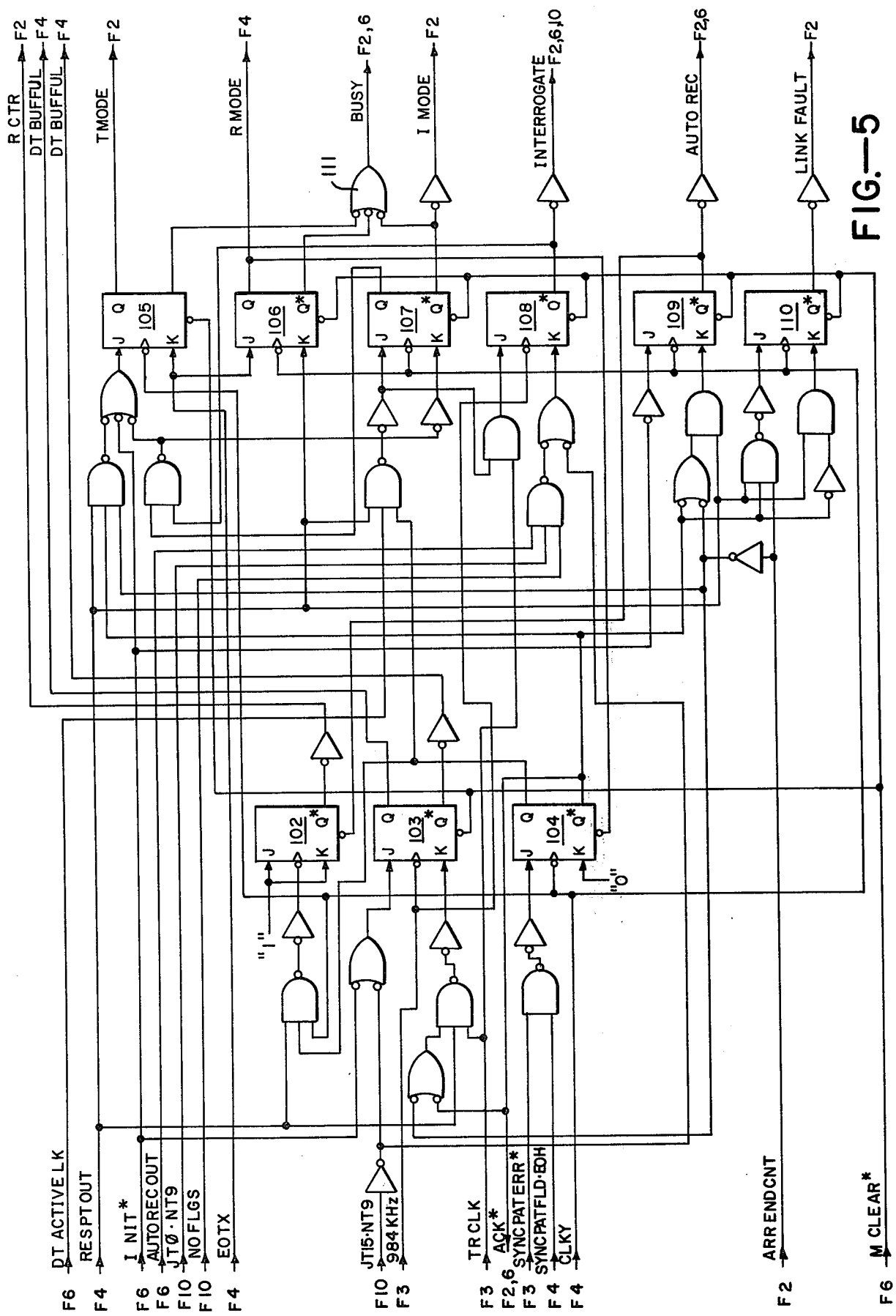
FIG.—5

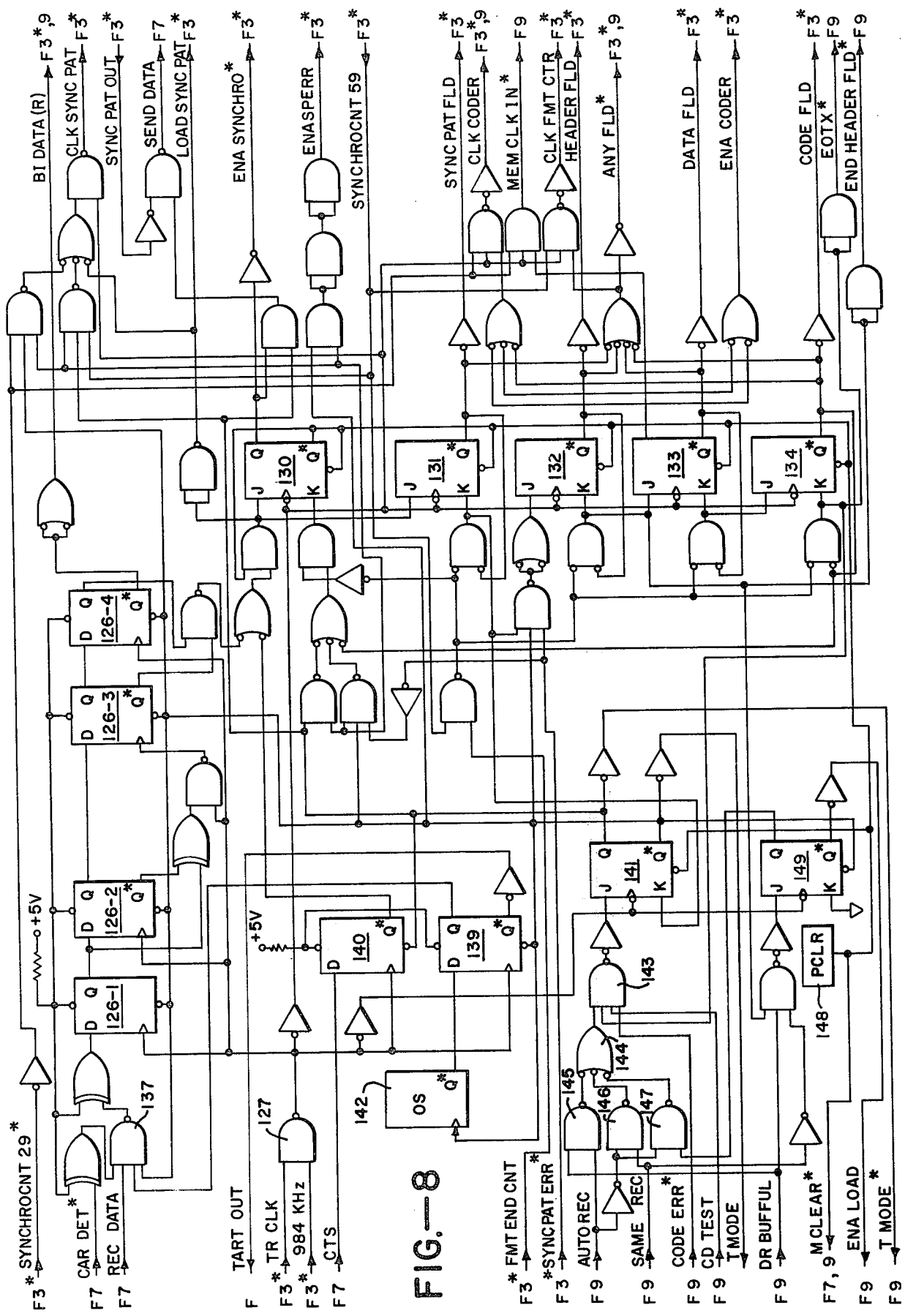
FIG.—8

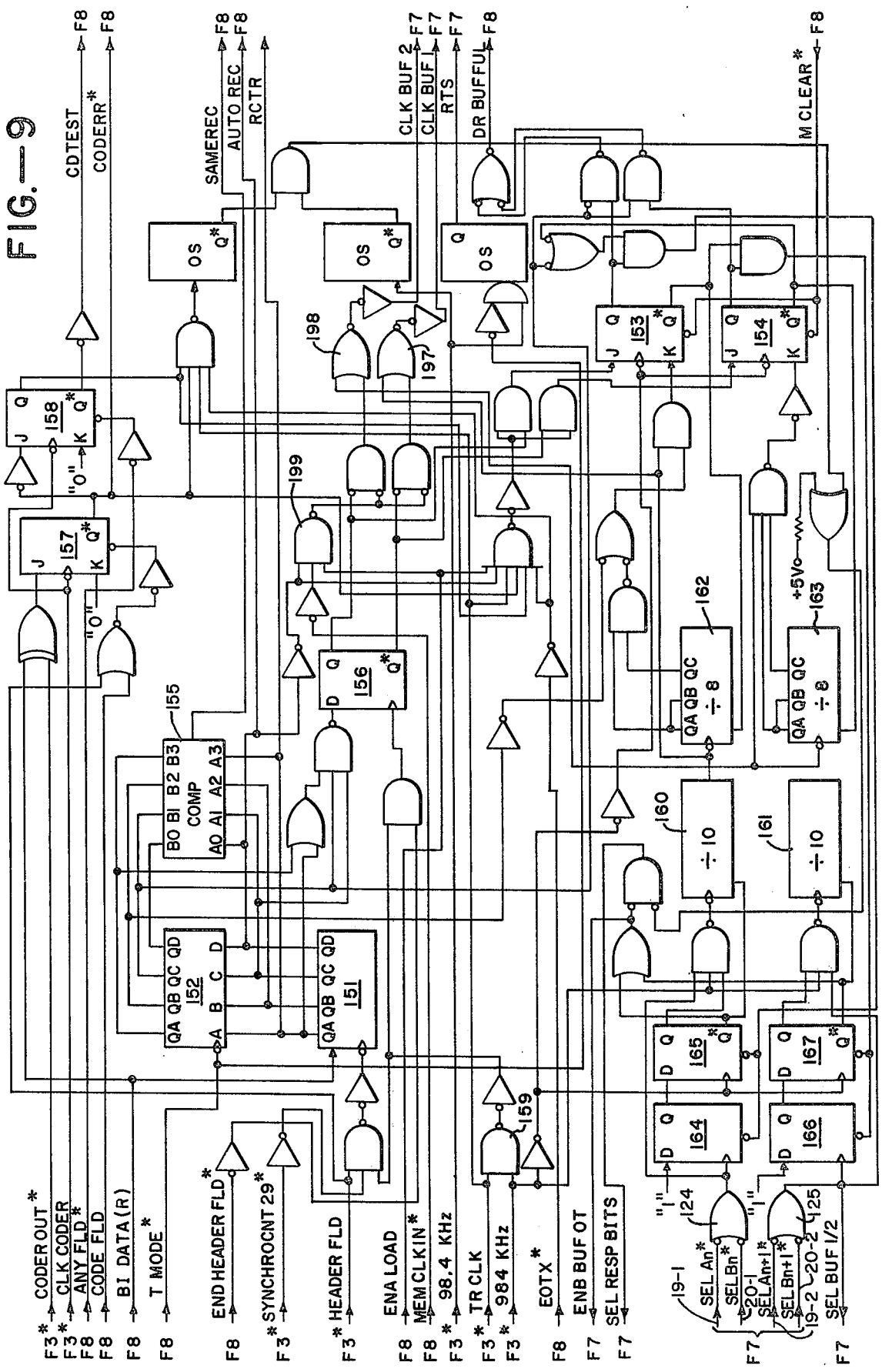
FIG.—9

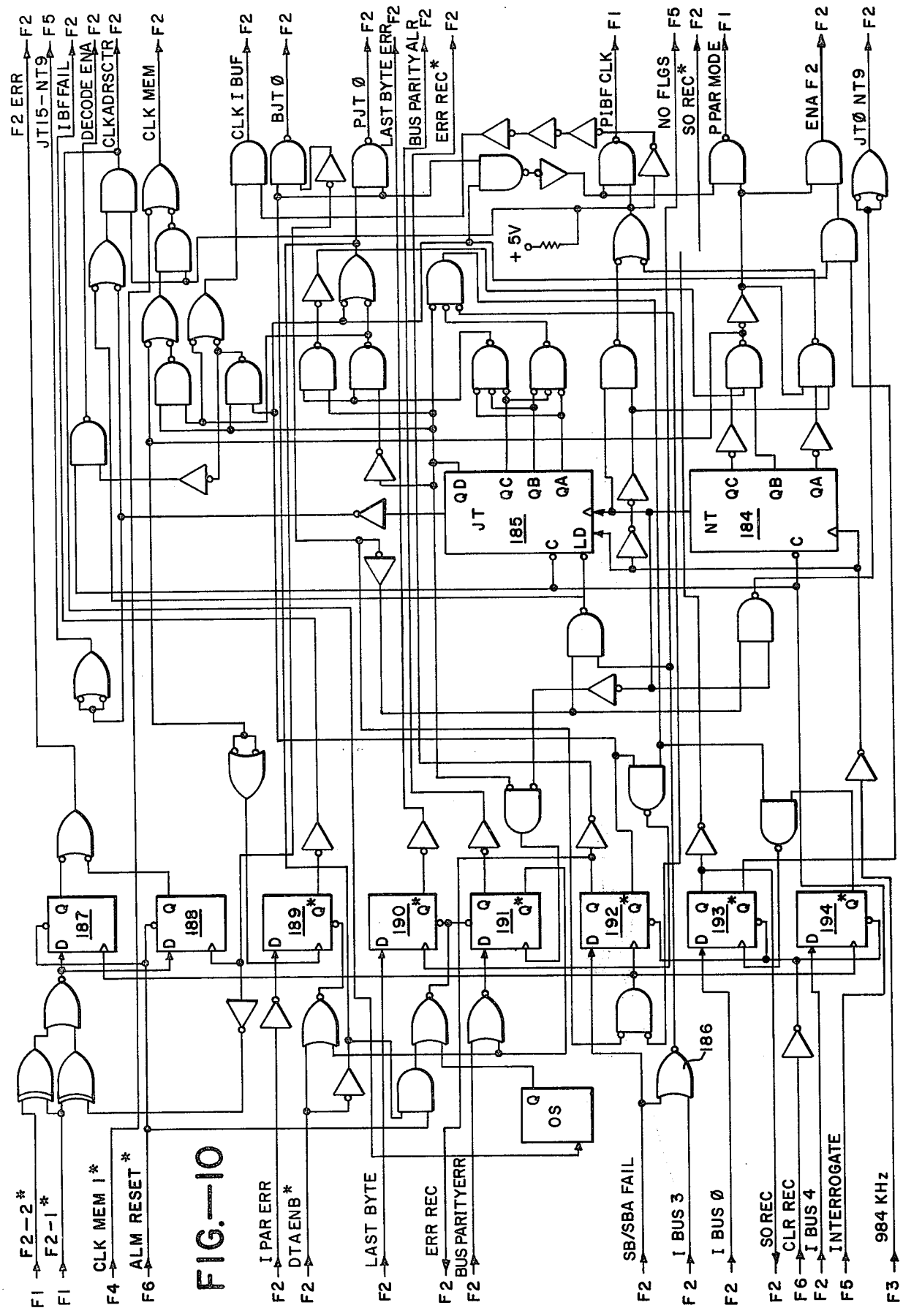
FIG.—10

REMOTE OFFICE MESSAGE METERING SYSTEM

CROSS REFERENCE TO RELATED APPLICATIONS

1. REDUNDANT TRANSMISSION NETWORK invented by John C. McDonald and Gary C. Henrickson, Ser. No. 545,757 filed Jan. 30, 1975, assigned to the assignee of the present invention.

2. REDUNDANT DATA TRANSMISSION SYSTEM invented by John C. McDonald and James R. Baichtal, Ser. No. 365,045, filed May 29, 1973, now U.S. Pat. No. 3,870,824 assigned to the assignee of the present invention.

BACKGROUND OF THE INVENTION

The present invention relates to the field of telephone systems and particularly to message metering systems for detecting and storing information concerning each subscriber's use of the telephone system.

Message metering equipment is necessary for recording information resulting from toll, long distance and other types of telephone service. Such equipment requires the ability to detect and store information to enable usage-sensitivity charging of subscribers. Local use by subscribers has been on a non-usage-sensitive basis employing equipment which has not been readily adapted for economical metering. With new types of local telephone usage such as credit-card checking, time-sharing data transmission and burglary prevention, a need for detecting and storing information concerning the nature of local usage has become important.

One message metering system suitable for local metering is described in U.S. Pat. No. 3,818,456. In that system, each local subscriber circuit is periodically addressed and connected to a digital encoder by a scanner bank. The digital encoder senses multistate subscriber signals representing usage and forms digital data. The digital data is transmitted to a scanner bank adapter where it is analyzed by the system and stored as usage data in internal memory locations for each individual subscriber. The internal memory storage locations are addressed in a sequential manner which corresponds to the sequential addressing of the subscriber circuits. Each time an internal memory location and a corresponding subscriber circuit is addressed, a multistate subscriber signal is sensed, interpreted and usage data is stored. The usage data is thereafter transferred from the internal memory to a larger-capacity external storage unit over data paths.

In the U.S. Pat. No. 3,818,456, the usage data output from each scanner bank adapter is connected using either one of two redundant data paths. The active states of redundant data paths are determined by an output and control unit. Specifically, the redundant data paths are interlocked by control networks of the type described in the cross-referenced application Ser. No. 365,045.

Because the system in the U.S. Pat. No. 3,818,456 is highly reliable, a need exists for extending the operation of that system to remote central offices, called tributary offices. Unattended tributary offices are frequently not suitable for collecting and processing data. It is often desirable to centralize the data collecting facilities so as to benefit from the economies of larger size.

In view of the above background, it is an objective of the present invention to provide a message metering system in which local recording offices and remote tributary offices are connected together in overall message metering systems of high reliability.

SUMMARY OF THE INVENTION

The present invention is a method and apparatus for metering subscriber usage of a telephone system. Each subscriber unit produces a subscriber signal utilized for determining subscriber usage of the telephone system. The subscriber signals are addressed and sensed to provide usage data indicating telephone system usage by each subscriber unit. A first memory having memory locations for each subscriber unit stores the usage data. A data link transfers usage data from the first memory to a second memory. Transfers over the data link are controlled by a first control unit. A data path transfers usage data to an output storage unit. Transfers over the data path are controlled by a second control unit.

In accordance with one feature of the present invention, the data link redundant channels where only one channel is active to transfer data at any time. When an error or other alarm condition occurs, another one of the redundant channels is enabled to transfer data.

In accordance with another feature of the present invention, the data path between the second memory and the output storage unit includes redundant channels where only one channel is active at any given time to transfer data. In the case of an alarm condition, another of the channels is enabled to transfer data.

In accordance with another feature of the invention, the redundant channels of the data link are interlocked to determine which is active by first control networks and the redundant channels of the data paths are interlocked to determine which is active by second interlocked control networks. Control of active states of channels in the data link and control of active states of channels in the data path is carried on independently.

In accordance with another feature of the invention, the data link includes retransfer apparatus for retransmitting data which is not acknowledged as correctly received. If after retransmission data is not acknowledged, another channel is activated and a data transfer is again attempted.

In accordance with another feature, a second memory connected to transmit over a first data link is also connected to receive data over a second data link whereby a system of channel data links is provided.

In view of the above summary, the objective of providing a message metering system in which central offices and remote offices are connected over data links in a highly reliable message metering system has been achieved.

Additional objects and features of the invention will appear from the following description in which the preferred embodiments of the invention have been set forth in detail in conjunction with the drawings.

BRIEF DESCRIPTION OF THE DRAWINGS

FIG. 1 depicts a schematic representation of a message metering system in which remote tributary offices are connected over single-channel and redundant-channel data links to a central recording office.

FIG. 2 depicts a schematic representation of a data transmitter employed within the system of FIG. 1.

FIG. 3 depicts a schematic representation of the common circuit employed within the data transmitter of FIG. 2 and when duplicated in the data receiver of FIG. 6.

FIG. 4 depicts a schematic representation of the detailed circuitry which forms a portion of the data transmitter control (DT CTL) within the data transmitting of FIG. 2.

FIG. 5 depicts a schematic representation of detailed circuitry which forms a portion of the data transmitter control (DT CTL) within the data transmitter of FIG. 2.

FIG. 8 depicts a schematic representation of the data receiver control (DR CTL) employed within the data receiver of FIG. 7.

FIG. 9 depicts a schematic representation of the data receiver receive and output control (DR REC OUTCTL) which forms a part of the data receiver of FIG. 7.

FIG. 10 depicts a schematic representation of the timing control (TIMING CTL) which forms part of the transmitter of FIG. 2.

DETAILED DESCRIPTION

Overall System — FIG. 1

Figure 7:
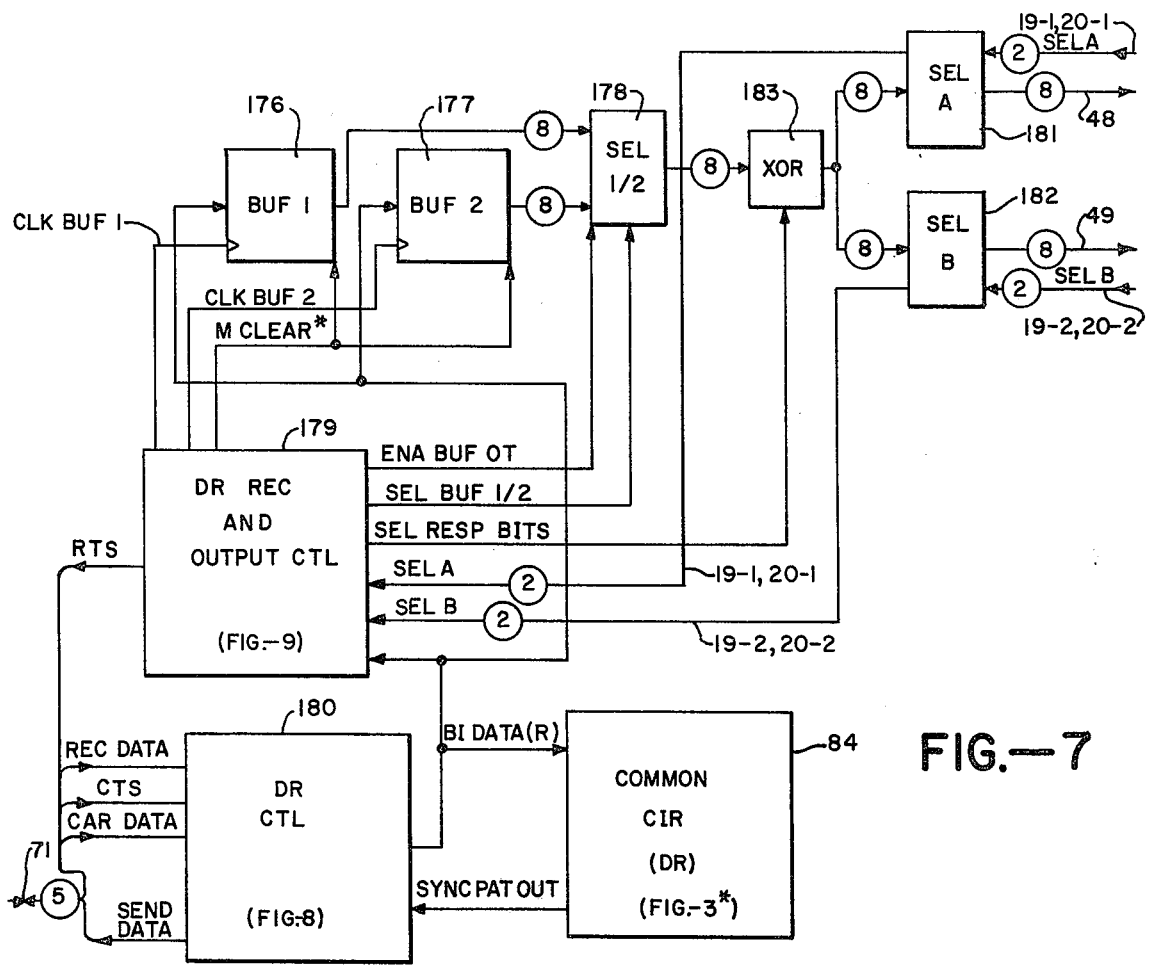
FIG. 7 depicts a schematic representation of a data receiver employed within the system of FIG. 1.

In FIG. 1, a message metering system is depicted which includes recording office circuitry 50 and a plurality of tributary offices 51 through 55. The recording office metering system of FIG. 1, in a preferred embodiment, is like that described in U.S. Pat. No. 3,818,456 with the addition of data receivers 64 and modems 65 for connecting remote tributary offices to the system over data links.

The tributary office 51 connects to the recording office 50 via a redundant, 2-channel data link 56. The tributary office 51 is itself connected to a further remote tributary office 54 via a redundant, 2-channel data link 59.

The tributary office 52 is connected to the recording office through a 1-channel data link 57. The tributary office 53 is connected through a redundant, 2-channel data link 58 to the recording office 50. The tributary office 53 is itself connected to a remote tributary office 55 via the 1-channel data link 60.

The number and arrangement of tributary offices with respect to the recording office is, of course, flexible. Additional tributary offices like tributary offices 51, 52 and 53 can be connected over 1-channel or 2-channel data links to the recording office 50. Furthr, additional tributary offices, like tributary offices 54 and 55, can be connected through other tributary offices to the recording office 50. Still further, additional tributary offices (not shown) can be input to the tributary offices 54 and 55 to form chains of three or more tributary offices which ultimately connect to the recording office 50.

Each tributary office includes a conventional subscriber switch such as a number 1 crossbar switch, a number 5 crossbar switch, a step-by-step switch or a panel switch. In FIG. 1, one representative configuration includes a number 1 crossbar switch 5-1 and a number 5 crossbar switch 4-1 within the recording office 50. The tributary office 51 includes a number 5 crossbar switch 4-2. The tributary office 52 includes a step-by-step switch 3. The types of switches within the tributary offices 53, 54, and 55 are not specifically identified but include any subscriber switch such as the conventional ones indicated.

In each of the offices, the various switches have as their outputs metering lines 6 which carry subscriber signals associated with each subscriber unit for indicating subscriber unit usage of the telephone system. A typical interconnection of the subscriber lines 6 for a number 1 crossbar switch is described in U.S. Pat. No. 3,818,456, column 4, lines 1 through 19. That description is hereby incorporated by reference in this application for purposes of teaching the connection of metering lines to a standard switching circuit. All of the metering lines 6 in the FIG. 1 system function to transmit subscriber usage signals. The usage signals are analyzed in the scanner banks 8 to provide subscriber usage data indicating usage of the telephone system by each of the subscriber units. The usage data for all of the metering lines 6 is stored in the scanner bank adapters 10. The usage data is transferred over a data path through the output and control unit (O CU) 14 for storage in a storage unit 21 or 22. The storage units are typically a tape unit A (TU A) 22 or a tape unit B (TU B) 21.

In FIG. 1, the recording office 50 has the number 1 crossbar switch metering line outputs organized in groups of 1,000 ($10^3$). Each group of 1,000 subscriber metering lines 6 connects to a scanner bank 8. Each scanner bank functions to periodically address the 1,000 input subscriber metering lines for metering signals to encode the subscriber signals to form digital representations. Each scanner bank is associated with a scanner bank adapter 10 which analyzes the encoded outputs from a scanner bank and stores usage data in storage locations for each subscriber unit. The subscriber usage data stored in the scanner bank adapters is transferred over one of two redundant data paths 48 or 49 which connect to the output and control unit 14. The redundant data paths 48 and 49 are under common control of the data path circuits 16 and 18, respectively, which function to buffer and control the transfer of data to the external storage units 22 and 21, respectively.

Additional scanner bank adapters 10 connect from the number 5 crossbar switch, through scanner banks 8, to also provide outputs on one of the other of the redundant data paths 48 or 49. In a similar manner, a service observing unit (SOU) 12 connects the outputs to the data path 48 and the data path 49.

In addition to the scanner bank adapters (SBA) and the service observing unit (SOU), data receivers (DR) 64 have outputs connecting to the redundant data paths 48 and 49. The data receivers store data from the remote tributary offices.

The output and control unit 14 is operative to sequentially scan the internal storage units consisting of the scanner bank adapters 10, the service observing unit 12, and the data receivers 64. Only one of the internal storage units is connected to either the A data path 48 or the B data path 49 at any one time. While the output and control unit 14 is scanning the internal storage units in the recording office, the tributary office systems are operating to transmit information over the data links 56, 57 and 58 to the data receivers (internal stores) in the recording office.

Referring to tributary office 51 for example, the number 5 crossbar switch 4-2 outputs metering lines 6' in groups of 1,000. The scanner banks 8' periodically address the lines 6' to provide encoded digital signals to the scanner bank adapters 10'. The scanner bank adapters 10' in the tributary office 51 analyze the digital signals and store data representative of subscriber usage. Each of the scanner bank adapters communicates over an A' data path, which is an 8-bit but 48', or a B' data path which is an 8-bit bus 49'. The data paths 48' and 49' connect as inputs to transmit and control unit (T CU) 66. The transmit and control unit 66 in the tributary office 51 is analogous to the output and control unit 14 in the recording office. The transmit and control unit 66 includes the A data transmitter (DT A) circuitry 61 and the B data transmitter (DT B) circuitry 62. In addition to the scanner bank adapters 10', the data paths A' and B' are connected to data receivers 64'-1 and 64'-2. The data receivers 64' receive and store information from the remote tributary office 54 over the redundant, 2-channel data link 59. A service observing unit 12' also connects to the buses 48' and 49'.

The transmit and control unit 66 is operative to sequentially scan the internal stores in tributary office 51 which includes the scanner bank adapters 10', the data receivers 64' and the service observing unit 12'. Only one of the internal stores is connected to either the A' data path or the B' data path at any one time.

While the message metering system in the tributary office 51 is operating, the tributary office 54 in a similar manner has its message metering system operating. Message metering data is transferred from tributary office 54 to tributary office 51 for storage in a data receiver 64'. In turn, the transmit and control unit 66 controls the transmission of data from receivers 64' (associated with tributary office 54) as well as data from scanner bank adapters 10' (associated with tributary office 51) to the data receivers 64 within the recording office 50. In the recording office 50, the output and control unit 14 functions, to transmit usage data to the external storage units 21 or 22. That data includes usage information associated with the tributary office 54, the tributary office 51, and the recording office 50. At the same time and in a similar manner, the output and control unit 14 collects usage data directly from the tributary offices 52 and 53 and from the tributary office 55 via office 53 in a manner which is apparent from the FIG. 1 apparatus.

The details of the scanner banks 8, the scanner bank adapters 10, and the output and control unit 14 (and their primed equivalents) are described in U.S. Pat. No. 3,818,456. The control networks of the system are described in the second above-identified cross-referenced application (Ser. No. 365,045). The transmit and control unit 66, the modems 65 forming data links, and the data receivers 64 are hereinafter described in further detail.

Transmit and Control Unit — FIG. 1

In FIG. 1, the transmit and control unit 66 is similar in structure to the output and control unit 14. The unit 66 includes an A data transmitter (DT A) 61 and an identical B data transmitter (DT B) 62. The A data transmitter is connected to receive the A' data path bus 48' and the B data transmitter is connected to receive the B' data path 49'. The A' and B' data paths connect from the scanner bank adapters 10', the data receivers 64' and the service observing unit 12'. The data transmitter 61 includes a control network 440 which controls the active and inactive state of the A data transmitter. In a similar manner, the B data transmitter includes a control network 440' which controls the active and inactive states of the B data transmitter. The control networks 440 and 440' are like those described in the second above-identified cross-referenced application.

Data Transmitter — FIG. 2

In FIG. 2, further details of the A data transmitter 61 of FIG. 1 are depicted as typical of all data transmitters employed in the FIG. 1 system. The A data transmitter of FIG. 2 connects to the scanner bank adapters, the data receivers and the service observing unit within the tributary office 51 of FIG. 1 with the 48-bit address bus 19'. Each one of the 48 lines 19' connects to a different one of the scanner bank adapters or consecutive pairs of the lines 19' connect to the data receivers or to the service observing unit 12'. The lines 19' are energized to select scanner bank adapters, one of the two buffer memories in the data receivers, or one of two stores in the service observing units one at a time. Only one of the lines 19' is enabled at any one time. For the data receivers and service observing units, first one of the two consecutive lines 19' is energized followed by energization of the second one of two. A scanner bank adapter or data receiver when selected by one of the lines 19' is to output data on the 8-unit A' data path bus 48'. Bus 48' is input to the 8-bit input register (I REG) 76 in FIG. 2.

The A data transmitter output is via the 5-bit bus 70 which connects to a conventional modem 65'-1 of FIG. 1. The five lines in the bus 70 are lines associated with conventional modems and include the output lines SEND DATA and RTS (request-to-send) and the input line REC DATA (receive data) CAR DET (carrier detect) and CTS (clear-to-send). Four of the five lines in the 5-bit bus 70 are derived from the data transmit control (DT CTL) 80 and the fifth, RTS, derives from the transmit turn-around timer 81.

In FIG. 2, the input data from but 48' is stored in the I register 76 by the CLK I BUF signal from the timing control (TIMING CTL) 77. Register 76 is a conventional 8-bit register. The contents of the register 76 are stored in an input buffer memory (I BUF) 78 which stores eight, 8-bit bytes of data. The buffer 78 is loaded with the contents of register 76 by a CLK MEM signal from the timing control 77. The buffer 78 is a conventional memory for receiving parallel-in data from register 76 and for delivering serially-by-bit output data on the output line MEM DAT O. The parallel-in or serial-out mode is controlled by the I MODE signal from the data transmit control (DT CTL) 80 (described in connection with FIGS. 4, 5, and 6). The data transmit control interconnects with a common circuit 84 (described in connection with FIG. 3). Circuit 84 includes circuitry which, when duplicated, is also employed in connection with the data receiver (described in connection with FIG. 7).

The data control 80 functions to determine the mode of the data transmitter of FIG. 2 thereby determining whether it will transfer data to the data receiver 64-1 of FIG. 1, receive data back from receiver 64-1 of FIG. 1 or be in some other mode. When in the transmit mode, serial-by-bit data from MEM DAT O line of buffer 78 is output on the SEND DATA line.

The data output on the SEND DATA line is proceeded with a header which is derived from a header register 87 which is responsive to an enable signal HEADER FLD to provide the header data serially-by-bit on the output line HEADER OUT. The header register 87 is typically a conventional 4-bit register which is clocked by the AND of the SYNCHROCNT 59, TRCLK and 984 KHz signals from FIG. 3. When enabled for parallel load, register 87 stores the four bits RCTR, ERREC*, SOREC*, AUTOREC from FIGS. 5, 10, 10 and 5, respectively.

After a certain number of attempts to transmit data to the receiver (16 attempts in the preferred embodiment) an automatic request repeat counter (ARR CNT) 86 provides an output signal ARR END CNT which signifies that transmitted data has not been received properly. The counter 86 counts each transmission by operation of NAND gate 85. Gate 85 produces an output to clock counter 86 whenever the response time out signal RESPTOUT indicates that a record was transmitted to the data receiver and that a predetermined time has elapsed for the data receiver to respond with a proper sync pattern to acknowledge the record transfer with ACK* a 0. The ACK* signal is derived from control 80 to indicate whether a valid synchronization pattern has been received back from the data receiver. With no acknowledgement (ACT* is 1) and the time-out is complete (RESPTOUT is 1), the TRCLK clock signal from the common circuit 84 clocks NAND gate 85 to increment counter 86.

The basic timing for inputting the data to register 76, inputting and outputting data from the buffer memory 78, and incrementing the addressing circuitry to provide the signals on lines 19' is under control of the timing control 77 described in connection with FIG. 10. Timing control 77 includes a counter with decoded outputs which count down the 984 KHz signal from the common circuit 84. When enabled, control 77 outputs clock signals to clock I register 76 and I buffer memory 78. Additionally, an address counter (ADR CTR) 79 is clocked by a CLK ADR CTR signal. Counter 79 is a 6-bit counter which counts through a count of 48. Counter 79 is enabled by the DPA ENB* signal. The 6-bit output from counter 79 is decoded in the address decoder (ADR DEC) 83 which functions to select the outputs 19' one at a time.

In FIG. 2, the modem timing circuit 81 is initiated by the TMODE signal from the data transmit control 80. Whenever transmission is initiated as indicated by the TMODE signal, one-shot 88 is continuously triggered by the 98.4 KHz signal from the common circuit 84 through gate 89. When gate 89 fires one-shot 88 an RTS signal is propagated immediately to the modem 65'-1 which operates to establish the carrier over the data link for a duration which lasts until a few milliseconds after TMODE is terminated. One-shot 90 is fired by the initial transition of one-shot 88 for a 15-millisecond period to time the return of a CTS signal. If the modem responsively sends back a CTS signal before 15 milliseconds, the conventional D type flip-flop 91 is set to a 1 thereby producing a 0 on its Q* output. If the D input to flip-flop 91 is not set to a 1 by the time the one-shot 90 times out, flip-flop 91 is clocked to produce a 1 on its Q* output thereby producing an alarm which indicates a modem fault by the MODEM FLT signal. The MODEM FLT signal as 1 produces a class 1 alarm input to the control network 440. In FIG. 2, and the other figures of the application, the bottom inputs to flip-flops, if any, are "clear" inputs and the top inputs, if any, are "preset" inputs.

Another alarm input to the control network 440 is the LINK FAULT signal from the data transmitter control 80. The LINK FAULT signal is actuated whenever the ARR END CNT signal from counter 86 signifies that an error-free transmission has not occurred after an attempt to transmit the record for a predetermined number of times (e.g. 16.).

In FIG. 1, the control networks 440 and 440' are identical to the like-numbered control networks in the above-identified second cross-referenced application Ser. No. 365,045). As discussed in that application and as occurs in the present application, control network 440 produces a DPA ENB* signal output on line 490 which is a 0 when the A data path is active. In a similar manner, the control network 440' produces a signal DPB ENB* output as a 0 on line 490' when the B data path is active.

In FIG. 2, whenever the signal on line 490 is 0, the DPA ENB* signal enables the address counter 79 and enables the data transmitter control 80. The signal on line 490 is also input to the control network 440' associated with the data transmitter B of FIG. 1. The 0 signal on line 490 signals to the control network 440' that the data transmitter A is active. In a similar manner, the DPB ENB* signal on line 490' connects from the control network 440' to signal the active or the inactive state of the control network 440'.

In addition to the enabling lines 490 and 490' which designate the active (0) or inactive (1) states of the control networks 440 and 440', the control networks are also interconnected with the alarm lines 430 and 430'. Line 430 carries the DTA ALARM signal which, when a 1, specifies to the control network 440' that the control network 440 has an alarm condition. Similarly, line 430' carries the DTB ALARM signal which, when a 1, specifies to control network 440 that the control network 440' has an alarm condition.

In general, the control networks 440 and 440' operate as follows. A control network in the active state continues to operate until it senses an alarm condition. Alarm conditions are produced, for example, when either of the signals MODEM FLT or LINK FAULT is a 1. Upon sensing an alarm condition, control network 440 switches from the active state with a 0 on line 490 to an inactive state with a 1 on line 490 depending upon whether or not line 430' indicates an alarm condition associated with the control network 440'. If there is no alarm condition in the control network 440', then control network 440 goes inactive. At the same time, control network 440' senses that the line 490 has gone from 0 to 1 thereby becoming inactive thereby switching line 490' from 1 to 0. The full details of the conditions under which the control networks 440 and 440' switch states are described in the above-identified, second cross-referenced application.

The general sequence of operations in the FIG. 2 data transmitter apparatus is as follows. The first function to be performed after initialization is to send a TEST record, in which all 72 data bits are 0's, to test whether or not the data link is properly operating.

When a TEST record has been called for, the data transmitter of FIG. 2 progresses to the transmit mode (T MODE). During the T MODE, the modem transmitter 65'-1 (assuming the data transmitter A is active), is activated and a carrier is established on the channel to the modem receiver 65-1. The data transmitter 61 then causes the TEST message to be transmitted to the data receiver 65-1. The first eleven bits of the TEST message are a synchronization pattern which the data receiver 64-1 must use to detect the start of message transmission. The next four bits constitute the message header, provided by the header register 87 in FIG. 2, which defines the type of record being transmitted and whether the record count is odd or even. The possible types of records following the header are (1) a normal SBA called data record containing information about subscriber usage, (2) a SB/SBA failure record indicating an improper functioning of a scanner bank or a scanner bank adapter, (3) a service observing unit call data record, and (4) a TEST record of all 0's.

The 4-bit message header and the 72-bit data record are followed by a 36-bit code field. The code field is a cyclically redundant check code computed from the header and data bits of the message. The code field is checked by the data receiver to determine if any transmission errors have occurred.

Transmission of the last code bit signifies the end of a record transmission and at the time the data transmitter always progresses to the receive mode (R MODE). During the R MODE, the data transmitter waits for approximately 36 milliseconds for the data receiver to acknowledge the record transmission by transmitting the 11-bit synchronization pattern back from the data receiver 64-1 through the modems 65-1 and 65'-1 to the data transmitter 61.

If the 36 millisecond response time has elapsed and the data receiver acknowledgement had not been received in the data transmitter, the data transmitter retransmits the record after returning to the T MODE. If a predetermined number of retransmission has already occurred, as counted by the ARR counter 86 in FIG. 2, a LINK FLT signal is generated which generally will cause the active state to be switched from data transmitter A to data transmitter B.

If the data receiver response time has elapsed and the data transmitter is not the active data transmitter when the data receiver acknowledgement has been received, that data transmitter will progress to the idle state which indicates that it is not in the transmitting, receiving or interrogatng modes.

In one preferred embodiment, an idle transmitter will remain idle for approximately 8 seconds before initializing another TEST record for verifying the data link. When the control networks 440, and 440' switch states the to-be-active data transmitter awaits the idle condition before initialization and transmission of a new TEST record.

After the data receiver response time has elapsed and a data receiver acknowledgement is received by the active data transmitter, the data transmitter progresses to the interrogate mode (IMODE). In the I MODE, the data transmitter selects and scans the outputs of the internal stores, that is, the scanner bank adapters, the service observing units and the data receivers. When scanning the internal stores the lines 19' are activated sequentially one at a time to provide data on the bus 48'. The data on bus 48' is analyzed for an output flag. If the data transmitter finds a scanner bank adapter, service observing unit or data receiver unit with a flag set, the data transmitter loads the data into the input register 76 and the buffer memory 78 and progresses directly to the T MODE for transmission of the data record.

During the I MODE, after a period of eight seconds elapses without a transmission actively on the data link 56, the I MODE is interrupted and a new test record is initialized and transmitted.

If the data receiver response time has elapsed, no data receiver acknowledgement has been received, and the maximum number of retransmit cycles has been attempted, the data transmitter will indicate a fault with a LINK FLT signal. When an active data transmitter produces a LINK FLT signal, the other data transmitter becomes active.

Timing Control — FIG. 10

In FIG. 10, the timing control 77 of FIG. 2 is shown in detail. The timing control 77 provides the basic timing and control signal for the interrogate mode (IMODE) of operation. When the INTERROGATE signal is true, the minor cycle counter (NT) 184 and the major cycle counter (JT) 185 are enabled. Counter 184 is a conventional divide-by-10 counter which counts the incoming clocks (984 KHz) to define the end of each byte (count NT9) of data coming on the I bus 48' from the scanner bank adapters. The major cycle counter 185 is a divide-by-16 counter which counts each count NT9 pulse which appears on the carry out from counter 184. The major cycle counter 185 counts up to sixteen bytes (0, ... 15) but does not increment above byte 0 (count JT 0) if no flags are set in byte 0. The no flag condition is indicated by a 1 for the NOFLGS signal from gate 186 which examines the fourth bit (IBUS 3) of bus 48'. The decoded outputs from counters 184 and 185 are used to indicate the appropriate times to load data bytes and check for errors.

In FIG. 10, the flip-flops 187 and 188 are used to check test failure on flag lines. The flip-flop 189 stores an indication of a failure in the input register (IBFF-AIL) and flip-flop 190 stores an indication that the last byte did not have response bits set (LAST BYTE ERR). The flip-flop 191 provides storage for but parity alarms (BUS PARITY ALARM) and flip-flop 192 stores a signal if byte 0 indicates a scanner bank or scanner bank adapter failure (ERR REC*). The IBUS 0 bit is examined during byte 7 count (JT 7.NT 9) and if it is true, a service observing record is being processed and flip-flop 193 so indicates with stores the SOREC* signal. The flip-flop 194 stores the byte 0 indication of a line interface unit failure (IBUF 4 true) and inhibits the setting of SOREC*.

In FIG. 10, the flag lines F2-2* and F2-1* are derived from the T, CU COMMON CONTROL within the tributary office 51. If the flags do not have an appropriate level at a time determined by the output from the JT counter 185, then the F2ERR signal is generated and input to the control network 440 of FIG. 2 as a class 2 alarm.

In FIG. 10, the IPARERR signal is typically generated by conventional parity circuitry (not shown), connected to the output of the I register 76 in FIG. 2, for indicating parity errors for data in register 76.

In FIG. 10, the BUSPARITYERR signal is generated by detector 123 in FIG. 2. Detector 123 includes conventional parity detection circuitry for detecting parity errors in the data on the I bus 48'. In addition to the parity detection circuitry in detector 123 of FIG. 2, detector 123 includes two additional gates for detecting data conditions on the bus 48'. Specifically, a detector is present for detecting 1's for BITS 4 and 5 in order to generate the LST BYTE signal. Also detector 123 includes a detector for detecing 1's for BITS 1 and 7 at a time when the BJTO* signal, from FIG. 10, is present to generate the SB/SBAFAIL signal. In FIG. 10, the ERRREC and SOREC signals are output to the header register 87 of FIG. 2 to be parallel loaded into register 87 along with the RCTR and AUTOREC signals from FIG. 9.

In FIG. 10, the output signal IBFFAIL is generated and is connected to the conrol network 440 as a class 1 alarm.

In FIG. 10, the LAST BYTE ERR signal and the BUSPARITYALR signal are connected as class 2 alarms to the control network in FIG. 2. While these alarms may be connected as alarm inputs in the same manner as the alarms previously described, they are preferably stored in flip-flops (not shown) clocked by the JT0 NT9 signal and then input as alarm signals. Other signals indicated in FIG. 10 not specifically referenced are connected to the common control in the tributary office of FIG. 1 for purposes of display or other features not important in connection with the present application.

The signal ENAF2 is employed in connection with test calls or other features of the invention when it is not desired so that a subscriber unit be billed for a specific call. In the embodiment where the ENAF2 signal is employed, it connects to an EXCLUSIVE-OR circuit (not shown) between the register 76 and the buffer 78 for forcing the state of predetermined data bits in the same manner as described in connection with the EXCLUSIVE-OR circuit 183 in FIG. 7. In this manner, test calls associated with particular subscriber units cause flags to be set into the data field. The flags are recognized to prevent the subscriber unit from being billed for test or other non-billable calls.

Common Circuitry — FIG. 3

Figure 6:
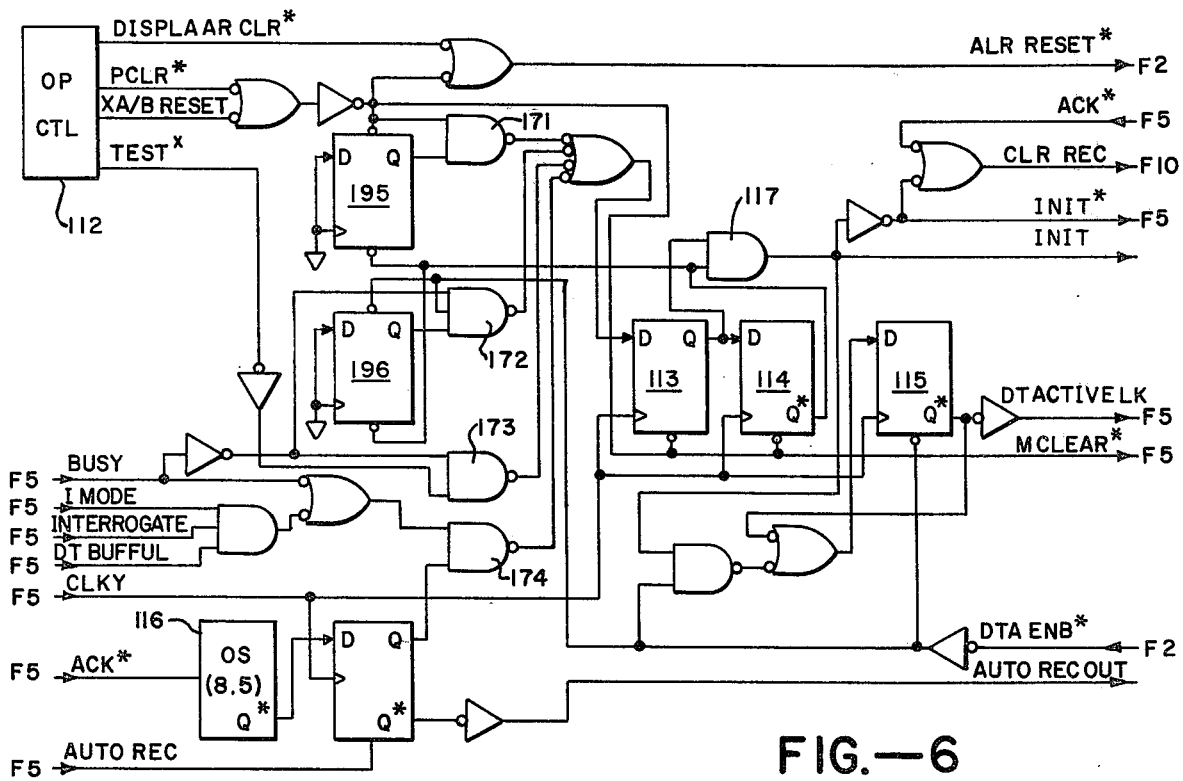
FIG. 6 depicts a schematic representation of circuitry which forms a portion of the data transmitter control (DT CTL) within the data transmitter of FIG. 2.

In FIG. 3, the common circuit 84 of FIG. 2 is shown in greater detail. The common circuit 84 of FIG. 3 is also duplicated and employed in the data receiver of FIG. 7. When referring to the duplicated FIG. 3 circuit utilized in FIG. 6, FIG. 3 is referred to as FIG. 3*.

In FIG. 3, a code generator 92 is provided to generate a CODEROUT* signal by way of an EXCLUSIVE-OR gate 97. Generator 92 is a 36-stage shift register which is stepped by the CLK CODER signal when enabled by the SYNCPATFLD signal. Code generator 92 has each of the 36 stages, 1, ... 36 from low-order to high-order, with each lower-order stage connected as an input to the next higher-order stage, either directly or through feedback EXCLUSIVE-OR gates. The other input to the feedback gates is the CODEROUT* signal from AND gate 98 when gate 98 is enabled by the ENA CODER signal. The inputs receiving the CODEROUT* signal and the output from the next lowerorder stage in an EXCLUSIVE-OR gate are defined by the equation for g(D) as follows:

$$g(D) = D36 + D34 + D32 + D31 + D3\phi + D29 + D27 + D24 + D23 + D21 + D14 + D13 + D11 + D1\phi + D8 + D6 + D5 + D4 + D3 + 1$$

The equation signifies that the CODEROUT* signal from gate 98 is input directly to the lowest order stage 1, is input with the output from the second stage through an EXCLUSIVE-OR gate to the third stage, is input with the output from the third stage through an EXCLUSIVE-OR to the fourth stage and so on. The CODEROUT* signal outputs from the code generator 92 is a Bose-Chadhuri code which is a well-known redundancy code.

The code generator 92 is cleared before each data record is transmitted by the SYNCPATFLD signal. A signal is output from the generator 92 to EXCLUSIVE-OR gate 97 only when the ENACODER signal signifies that data is present in the data transmitter of FIG. 2. The data appears as the signal SENDDATA input to AND gate 99. When the common circuit of FIG. 3* is employed in the data receiver of FIG. 7, rather than the SENDDATA signal, AND gate 99 receives the BIDATA(R) signal. When enabled by the ENACODER signal, gate 99 passes the SENDDATA data to EXCLUSIVE-OR gate 97 to be combined with the output from generator 92 to form the CODEROUT* signal. The ENACODER signal is true during the HEADERFLD and DATAFLD signals. In operation, a code word is stored in the code generator 92 which is a function of the data transmitted through gate 99 and EXCLUSIVE-OR gate 97. After the code word has been generated, the ENACODER signal goes to 0 inhibiting any output from gate 99 or any further feedback through gate 98 to the code generator 92. In this mode, stepping of the CLK CODER signal causes the code word to be shifted out of generator 92 serially-by-bit through the EXCLUSIVE-OR gate 97 and appears when inverted as the CODEROUT* signal which connects as an input to the data transmitter control 80 in FIG. 4 where it connects to the modem 65'-1.

In FIG. 3, the sync pattern generator (SYNC GEN) 93 is a conventional device which generates an 11-bit BARKER sequence which is employed to establish reliable record synchronization between the data transmitter 61 and the data receiver 64-1. The BARKER sequence is 01001000111 in the order in which the bits are shifted out (left first, right last) as the SYNCPATOUT signal. The sync pattern generator 93 is initialized by a LOADSYNCPAT signal. When initialized by that signal, the BARKER sequence is shifted out by the CLKSYNCPAT* signal serially-by-bit. The SYNCPATOUT signal carrying the BARKER sequence is connected to the data transmitter control 80 in FIG. 2 where, under appropriate conditions, it is output on the SENDDATA line for transmission through the modems over a data link to a data receiver.

In addition to providing a code for transmission from the data transmitter to the data receiver, the sync generator 93 is also utilized to compare an answer-back sync pattern transmitted from the data receiver to the data transmitter. The comparison of the sync pattern received from the data receiver appears on the BIDATA line which, together with the output from the generator 93 are input to the EXCLUSIVE-OR gate 75. Whenever the output from generator 93 does not compare with a bit on the BIDATA line, gate 75 outputs a 1 to the J input of the conventional JK flip-flop 73. Flip-flop 73 is clocked through AND gate 74 whenever the CLKSYNCPAT signal occurs at a time when gate 74 is enabled by the ENASPERR signal. The ENASPERR signal is present whenever the data transmitter of FIG. 2 is in the receive mode. When the common circuit of FIG. 3* is employed in the data receiver of FIG. 7, then the ENASPERR signal is a 1 to enable gate 74 whenever the data receiver is in the receive mode.

At any time when the flip-flop 73 is clocked by gate 74 and the receiver sync pattern on the BIDATA line does not compare with the transmitter sync pattern from generator 93, the SYNCPATERR* signal is 0 thereby indicating an error in the sync pattern.

The clock generator 94 is a conventional device for counting down a crystal oscillator frequency of 9.84 MHz with divisions of 10 and 100 to produce frequencies of 984 KHz and 98.4 KHz. Typically 984 KHz is the interrogation frequency. The transmit and receive frequency is provided at 98.4 KHz and is identified as the TRCLK signal. An alternate frequency for the TRCLK signal is 49.2 KHz if lower speed operation is desired.

The syncro counter (SYNCHRO CTR) 95 functions to divide the CLKSYNCRO signal by 60 to define the length of a bit period during transmission. The CLKSYNCRO signal has the frequency of and is derived from the TRCLK signal. The syncro counter 95 is enabled to count whenever the ENASYNCHRO* signal is true which occurs during transmission or reception of data records. Counter 95 provides an output SYNCROCNT 59 at the end of each data bit period thereby causing the transmitting unit to send the next bit to the modem for transmission and the syncro counter 95 returns to the 0 count. Counter 95 also provides an output signal SYNCHROCNT 29 for marking the data bit center within a data record so that the receiving unit can clock that data bit into a local register.

In FIG. 3, the format counter 96 counts the CLKFMTCTR signals for the purpose of determining when the last bit of a current record field is being transmitted or received. The CLKFMTCTR signal counted by counter 96 is the same frequency as the SYNCROCNT 59 from the syncro counter 95. Counter 96 is enabled to count with an ANYFLD* signal.

The decoder 72 detects four different counts in counter 96 to provide a FMTENDCT signal to signify the end of each of four fields. The output from decoder 72 occurs to signify the end of the sync field after a count of eleven, provided the SYNCPATFLD signal is present, again at the end of the header field after count 4, provided the HEADERFLD signal is present, again at the end of the data field at count 72, provided the DATAFLD signal is present, and finally at the end of the code field at count 36 provided the CODEFLD signal is present. The total record field is 123 bits where the data field includes 64 data bits and 8 parity bits. The FMTENDCT signal outputs from decoder 72 is input to the data transmitter control 80 of FIG. 2 to cause a shift to the next field. Also the FMTENDCT signal enables a parallel load(L) input for counter 96 which, at the end of each field, loads all 0's into counter 96. When employed in the data receiver of FIG. 6, the output from decoder 72 performs an analogous function.

Data Transmitter Control — FIG. 4

In FIG. 4, a portion of the data transmitter control (DT CTL) 80 of FIG. 2 is shown. In FIG. 4, a data synchronizer comprising the conventional D-type flip-flops 26-1 through 26-4 appears. The inverted input at the bottom inputs to all flip-flops in the application are "clear" inputs. Similarly, inputs, if any 1 at the top are preset inputs. During the receive mode a 1 for the RMODE signal from FIG. 5 removes the clear input from the flip-flops 26. When NAND gate 37 is otherwise enabled, the first flip-flop 26-1 is ready to store data from the transmitter as received on the RECDATA line from FIG. 2. Gate 37 is only enabled after a turn-around delay established by the 0 millisecond conventional one-shot 36 which sets the conventional D-type flip-flop 39 in response to an RMODE 0 to 1 transition. The Q output of flip-flop 39 provides one enable input to NAND gate 37. Another enable input to gate 37 provided by the EXCLUSIVE-OR of the CARDET* and ACK* signals which signify that the carrier has been detected but that no acknowledgement has yet been received, respectively. The function of the first flip-flop 26-1 is to provide synchronized data with the clock signal from NAND gate 27 which receives the TRECLK and 984 KHz signals. Flip-flop 26-2 provides a buffered data output which allows the input to flip-flop 26-3 to be clocked only upon a change between the outputs from flip-flops 26-1 and 26-2 as determined by EXCLUSIVE-OR gate 28. The output from flip-flop 26-3 is therefore integrated data which is again buffered in flip-flop 26-4 to screen out noise spikes. The output from flip-flop 26-4 provides the buffered and integrated data output identified as the BIDATA signal. The BIDATA signal connects to FIG. 3 where it is compared with the output from the sync generator 93.

The outputs of flip-flops 26-3 and 26-4 are compared to detect a transition of the incoming data from a 1 to 0. When a 1 to 0 transition has occurred at a time when the CTS and DTBUFUL signals are present, the CLKY signal from NAND gate 27 clocks the conventional JK flip-flop 30 to provide a 1 on its Q output. The Q output of flip-flop 30 is inverted to provide the ENASYNCHRO* signal which enables the counter 95 in FIG. 3.

In FIG. 4, the conventional JK flip-flops 31, 32, 33 and 34 are the memory elements of the field control logic. When the ENASYNCHRO flip-flop 30 is set with a 1 on its Q output, flip-flop 31 is also set with a 0 on its Q* output which when inverted provides the SYNCPATFLD signal as a 1. If the data transmitter is in RMODE, the first eleven bits received are compared to the local sync pattern generator 93 output, in FIG. 3, to detect any errors and after eleven bits, the FMTENDCT signal from FIG. 3 causes both flip-flop 30 and flip-flop 31 to be reset. If the data transmitter is in the TMODE, the TMODE signal is input initially to the J input of the header field flip-flop 32. When the header field has been counted out, the FMTENDCT signal from FIG. 3 is input to the K input of flip-flop 32 causing flip-flop 32 to be clocked to the reset condition. The K input to flip-flop 32 is also input to the J input of the data field flip-flop 33. When flip-flop 32 is reset, flip-flop 33 becomes set providing a 0 on its Q* output which when inverted provides the DATAFLD signal.

After the data field has been counted out, the FMTENDCT signal is input to the K input of flip-flop 33 causing it to be reset while at the same time input to the J input of code field flip-flop 34. The code field flip-flop 34 becomes set when the data field flip-flop is reset. After the code field has been counted out, the FMTENDCT signal is input to the K input of flip-flop 34 causing it to be reset and is also output to provide the end of transfer signal (EOTX).

When the flip-flops 31 through 34 are separately set with 1's on their outputs, the four AND gates 42, 43, 44 and 45 are enabled, respectively, to allow the SYNCPATOUT, MEMDATAO, HEADROUT, and CODEROUT signals, respectively, from FIG. 3 to be gated out through NAND gate 41 as the output SENDDATA. The SENDDATA signal, in addition to being connected as an input to FIG. 3, is provided to the modem 65'-1 in FIG. 1 via the bus 70 of FIG. 2.

In FIG. 4, two time-out circuits are provided to insure proper switching between the TMODE and RMODE. At the end of a record transmission as indicated by a 1 for the EOTX signal, the data transmitter always goes directly from the TMODE to the RMODE. When the RMODE signal goes from 0 to 1, the one-shots 35 and 36 are triggered. After about 10 milliseconds, conventional D-type flip-flop 39 is set indicating that the turn-around delay has elapsed thereby enabling NAND gate 37 so that data can be received and input to the synchronization flip-flop 26. This delay is provided so that modems in half-duplex operation, can reverse the direction of transmission and allow transients on the line to settle. Approximately 36 milliseconds after entering RMODE, the conventional D-type flip-flop 38 is set to produce the RESPTOUT as a 1. The 36 millisecond delay of one-shot 35 defines the maximum time that the data transmitter will remain in the RMODE awaiting an acknowledgement (ACK*) from the data receiver before assuming a new mode.

In FIG. 3, various logic gates are enabled to output the CLKY signal from NAND gate 27 to clock the various generators and counters of FIG. 3.

Data Transmitter Control — FIG. 5

In FIG. 5, the conventional JK flip-flops 102 through 110 are employed to store the various states of the data transmitter. Particularly, the odd/even record counter flip-flop 102 provides the RCTR output indicating whether an odd or even record is being processed. The data transmitter buffer memory flip-flop 103 provides the DTBUFFUL signal to indicate when the memory 78 of FIG. 2 is full. The acknowledgement flip-flop 104 is set to indicate that a data receiver record acknowledgement has been received by providing an ACK* output. The test record flip-flop 109 provides an output AUTOREC to indicate that a test record is in progress. The link fault flip-flop 110 provides an output LINK-FAULT to indicate that no data receiver acknowledgement has been received after the predetermined maximum number of retransmissions has occurred.

The mode control flip-flops 105, 106 and 107 are employed to indicate the modes TMODE, RMODE, and IMODE of the system, respectively. Whenever one of the flip-flops 105 through 107 provides an output, a BUSY signal is generated through NAND gate 111.

The interrogate flip-flop 108 is employed when switching to IMODE to achieve synchronization with the TRCLK signal.

DT Initialization and Lock Circuit — FIG. 6

In FIG. 6, a portion of data transmitter control 80 of FIG. 2 is shown in further detail. In FIG. 6, th operation control 112 provides output signals for clearing the system or testing the system. For example, the PCLR* signal is generated whenever power is turned on and functions to produce the master clear signal MCLEAR*. Other conventional signals may be employed to generate the master clear signal. For example, a manual push button switch or automatic command XA/B RESET can be used in any conventional manner to generate the MCLEAR* signal.

The initialization circuitry of FIG. 6 causes the data transmitter to go through the initialization routine to generate an INIT* signal from the inverted output of AND gate 117. The AND gate 117 functions to compare the Q and Q* outputs of conventional D-type flip-flops 113 and 114. Flip-flop 114 is set by the Q output of flip-flop 113. A number of conditions exist for clocking flip-flop 113 to store either a 1 or a 0. Whenever MCLEAR* is 0, flip-flops 113 and 114 are held clear. The conventional D-type flip-flops 195 and 196 are either preset (top input) or cleared (bottom input) in order to control the 1 or 0 to the D input of flip-flop 113. Flip-flop 195 is preset by the operation of the MCLEAR* signal being a 0. Flip-flop 196 is preset by the operation of DTAENB* being 0.

The INIT* signal is generated as a 0 when four conditions determined by NAND gates 171 through 174 are satisfied. The four conditions occur when (1) MCLEAR* goes from 0 to 1, (2) DTAENB* goes from 1 to 0, (3) when DTAENB* is 1, the data transmitter test switch is activated with TEST* a 0 and BUSY a 1 (4) if there have been no acknowledgement received within approximately the last eight seconds as timed by one-shot 116. Whenever any of the previous conditions are generated, the AND gate 117 comparing the Q and Q* outputs of flip-flops 113 and 114, respectively, provides the signal when inverted which is INIT*.

The INIT* signal causes the data transmitter to start a test record transmission so that the link may be verified before proceeding to interrogate a scanner bank adapter.

Convention D-type flip-flop 115 stores an active status lock condition and provides the output signal DTACTIVELK for indicating when the A data transmitter 61 is the active one and has been initialized by the FIG. 6 circuit. Although, the control networks 440 and 440' are allowed to asynchronously switch active status between the A data transmitter 61 and the B data transmitter 62, the flip-flop 115 is allowed to be set only after the A data transmitter has been properly initialized by the operation of the FIG. 6 circuitry as evidenced by the generation of the INIT* signal.

Data Receiver — FIG. 7

In FIG. 7, further details of the A data receiver 64-1 are depicted. The A receiver 64-1 is typical of all the data receivers in FIG. 1, such as the B data receiver in the recording office 50 and the A and B receivers 64'-1 and 64'-2 in the tributary office 51. The data receiver 64-1 connects to the modem 65-1 of FIG. 1 by the 5-bit bus 71. Referring to FIGS. 1 and 7, the data receiver connects to the output and control unit 14 via the 8-bit data path A but 48 for transferring data from data receiver 64-1. Similarly, the data receiver of FIG. 7 connects in FIG. 1 to the 8-bit data path B bus 49 for transferring data over data path B. The selection of which data path, A or B, is active for transfers of data is under control of the SELA lines 19-1, 19-2 or the SELB lines 20-1, 20-2. The select lines 19-1, 19-2 are derived from the output and control unit data path A circuitry 16 and appear in FIG. 1 as lines 19-1 and 19-2. Similarly, the selection lines 20-1, 20-2 are derived from the data path B circuitry 18 in FIG. 1 and are designated as lines 20-1 and 20-2. When the lines 19-1, 19-2 are selected, the conventional selection circuitry (SELA) 181 selects the output from circuitry 183 for connection to the data path A bus 48. When the lines 20-1, 20-2 are selected, the conventional selection circuitry (SELB) 182 selects the output from circuitry 183 for transferring data on the B bus 49. The reason that selection circuits 181 and 182 receive two input lines is to allow to the A data receivers 64-1, for example, to process data from a service observing unit, such as unit 12' in the tributary office 51, which effectively outputs 16 bits of data.

In FIG. 7, input data, from modem 65-1 of FIG. 1, appears on the RECDATA line and is input to the data receiver control (DR CTL) 180. The control 180 in FIG. 7 performs analogous functions to those performed by the data transmitter control 80 of FIG. 2. The data on the RECDATA line is output from control 180 on the BIDATA (R) line for input to either the first buffer (BUF 1) 176 or the second buffer (BUF 2) 177. The BIDATA (R) data is stored in the first buffer 176 under control of a CLKBUF 1 signal and is stored in a second buffer 177 under control of a CLKBUF 2 signal. Information is cleared from buffers 176 and 177 by the MCLEAR* signal. Buffers 176 and 177 are each conventional memory devices for storing eight 8-bit bytes of data with serial-by-bit input and 8-bit parallel output. The 8-bit outputs from buffers 176 and 177 can be selected one at a time by conventional selection circuit (SEL ½) 178 under control of the SELBUF ½ signal. An output from selection circuit 178 is provided from either one of the 8-bit buses from buffers 176 and 177 only when the ENABUFOT signal is true.

The EXCLUSIVE-OR (XOR) circuit 183 functions to force predetermined bits in the byte 0 data output from selection circuit 178 to a predetermined state under control of the SELRESPBITS signal. The byte 0 response bits are true when no data receiver internal faults exist and no usage data is ready for output. Circuit 183 inserts alarm indications into bits 0 and 7 of the data transferred to the output and control unit 14 of FIG. 1 when alarm conditions exist. The ENABUFOT signal is not set whenever an alarm occurs or when no data is ready for output. In the absence of an alarm and in the absence of data ready for output, then BIT 0 and BIT 7 of BYTE 0 are set to 1's by the operation of the SETRESPBITS signal in the circuit 183. If the data receiver has an alarm, however, the response bits are not set and hence the 0 condition for BIT 0 and BIT 7 signal an alarm condition to the output and control unit.

Control signals for controlling an operation of the data receiver of FIG. 7 are derived from the data receiver receive and out control (DR REC OUT CTL) 179, from the data receiver control (DR CTL) 180 and from the common circuit 84. Common circuit 84 is identical to the common circuit 84 in the data transmitter of FIG. 2 and is depicted in detail in FIG. 3*. Further details of the control 180 are depicted in FIG. 8 and further details of the control 179 are depicted in FIG. 9.

Data Receiver Control — FIG. 8

The data receiver control 180 of FIG. 7 is shown in greater detail in FIG. 8. The data receiver control 180 performs within the receiver of FIG. 7 essentially the same function that the data transmitter control of FIG. 4 provides for the data transmitter of FIG. 2. The basic differences are that whatever the data transmitter does in the transmit mode, the data receiver must do in the receive mode and vice versa.

In FIG. 8, input data on the RECDATA line from bus 21 of FIG. 7 is input through NAND gate 137 when that gate is enabled. Gate 137 is enabled by the Q output of the conventional D-type flip-flop 139 which controls the turnaround delay. Flip-flop 139 is clocked by the NAND gate 127 clock output. Flip-flop 139 is set to a 0 by the Q* output from one-shot 142 for the turnaround delay. One-shot 142 is triggered whenever the Q* output of conventional JK flip-flop 141 has a 0 to 1 transition indicating that the data receiver has been switched from the transmit mode to the receive mode. The output from one-shot 142 is a 0 for the turnaround time-out period so that conventional D-type flip-flop 139 stores on a 0 on its Q output which inhibits the NAND gate 137 from receiving input data. After the time-out period, when the receiver is in the receive mode (that is, not in TMODE) and the time-out has occurred, data from the RECDATA line is input to the conventional D-type flip-flops 126-1 through 126-4.

The flip-flops 126-1 through 126-4 are analogous in operation and function to the flip-flops 26-1 through 26-4, respectively, in FIG. 4. The Q* output from flip-flop 126-4 as inverted appears as the BIDATA(R) signal. The BIDATA(R) signal is input to the common circuitry of FIG. 3*. In FIG. 3*, the BIDATA(R) signal is input to gate 99 in lieu of the SENDDATA signal which is used in FIG. 3.

In FIG. 8, the conventional JK flip-flops 130 through 134 function in an analogous manner to the flip-flops 30 through 34, respectively, in the FIG. 4 circuitry. In FIG. 8, the clocking and control signals input to the common circuit of FIG. 3* are generated in the same manner as in connection with FIG. 4.

The FIG. 8 circuitry differs from the FIG. 4 circuitry since the data receiver has only two primary modes of operation, transmit and receive. Accordingly, in the data receiver of FIG. 8, the modes are controlled by a single TMODE flip-flop 141. The TMODE flip-flop 141 is set only when (1) a record has been received as indicated by the EOTX signal and (2) the coder circuitry tested OK as indicated by the CDTEST signal and (3) no transmission error occurred as indicated by the CODERR* signal and (A) the record was loaded into memory as indicated by the ENALOAD signal or (B) the record was a retransmission of a previously loaded record as indicated by the SAMEREC signal or (C) the record was a TEST record indicated by the AUTOREC signal and the data receiver buffer is available as indicated by the DRBUFFUL signal. The conditions (1), (2), and (3), are provided by the inputs to NAND gate 143 together with the OR input from gate 144 which combines the outputs of NAND gates 145, 146 and 147 corresponding to the conditions (A), (B), and (C), respectively.

The POWER CLEAR circuit (PCLR) 148 functions in a conventional manner to detect whenever a power off condition changes to a power on condition. Circuit 148 provides the MCLEAR* output signal which is a master clearing signal utilized in the data receiver.

The conventional JK flip-flop 149 provides the ENALOAD signal as inverted from its Q* output which enables the loading of the data receiver call buffers by enabling energization of the CLKBUF 1 and CLKBUF 2 signals in FIG. 9.

Data Receiver Receive and Output Control — FIG. 9

The DR REC and Output CTL 179 in FIG. 7 is depicted in detail in FIG. 9. The circuitry of FIG. 9 provides the control logic for movement of data into and out of the data receiver buffer memory (buffers 176 and 177 in FIG. 7). In FIG. 9, the HEADERFLD signal from FIG. 3* is input to the register 151 under control of the clock signal from gate 159 and the SYN- CHROCNT 29* signal The BIDATA(R) signal supplies data to the register 151 serially-by-bit. After a new 4-bit header field is received and stored in register 151, the parallel output, on outputs QA through QD, are input to the comparator 155. At the same time, the outputs QA through QD, from a second 4-bit header register 152 are also input to the comparator 155. Register 152 stores the contents of the header field for the current data record and register 151 stores the header field for the new data record. If the two records are the same, comparator 155 provides a 1 for the SAME REC output signal. The SAME REC output signal causes the data record to be reacknowledged but does not cause it to be reloaded into the buffer memory. A 1 for the QD output of register 151 signifies that the record is a TEST record thereby enabling the AUTOREC signal as a 1. The TEST records, are not loaded into memory and are acknowledged only if the data receiver memory is available for a new record. When the data receiver is switched to the transmit mode as evidenced by TMODE* going from 1 to 0, the message header in register 151 is transferred into the current header register 152 causing the appropriate one of the flip-flops 153 or 154 to be set. Conventional JK flip-flop 153 is set to signify by the DRBUF1FUL signal that the first buffer 176 in FIG. 7 is full. Similarly, conventional JK flip-flop 154 is set to indicate that the second buffer 177 in FIG. 7 is full by the signal DRBUF2FUL. Flip-flops 153 or 154 are set under control of the conventional D-type flip-flop 156.

Flip-flop 156 normally is set in response to the fourth bit of the header field (QA). In the case of a service observing report, two buffers are employed. When the second buffer is to be loaded, flip-flop 156 is set by detecting a difference between the QA outputs of registers 151 and 152.

In FIG. 9, he MEMCLKIN* signal is operative to produce the CLKBUF1 signal or the CLKBUF2 signal when gated through the NOR gates 197 and 198, respectively. The MEMCLKIN* signal is propagated through NAND gate 199 provided the QD output from header register 151 is 0 and the ENALOAD signal is 1. When these conditions are met, either the CLKBUF1 or CLKBUF2 signal, as determined by the setting of flip-flop 156, leads up to eight bytes of data into one or the other of the buffers of FIG. 7.

Whenever it is desired to read out data from the buffers of FIG. 7, the selection gates 124 and 125 detects one of the SELA or SELB signals which set one of the conventional D-type flip-flops 164 or 166. When one of the flip-flops 164 or 165 becomes set with a 1, the connected flip-flop 165 or 167, respectively, is set in synchronism with the 984 KHz signal.

When flip-flop 165 is the one that is set, a conventional divide-by-10 counter 160 is enabled to count down the 984 KHz signal to provide an output every 10 microseconds. Each output from counter 160 is propagated through NOR gate 197 to form the CLKBUF1 signal. Each time the CLKBUF1 signal is stepped, one byte of date from the first buffer 176 of FIG. 7 is transferred out through the selection cicuitry 178. Conventional divide-by-8 counter 162 counts the output of each byte up to a total of eight bytes and then causes conventional JK flip-flop 153 to be clocked to the reset condition. When reset flip-flop 153 feeds back and clears flip-flops 164 and 165 inhibiting any further counting of the counters 160 and 162.

In a manner similar to flip-flops 164 and 165 and counters 160 and 162, flip-flops 166 and 167 and counters 161 and 163 control the outputting of data from the second buffer 177 in FIG. 7.

In FIG. 1, the OCU COMMON CONTROL circuitry 17 in one embodiment includes a digital clock which functions to insert the time (including data, hours minutes and seconds) into a field associated with data being transferred by the DP-A control 16 or the DP-B control 18. Alternatively, in another embodiment redundant digital clocks are included. One clock is included in the circuitry 16 and one clock is included in the circuitry 18 for inserting time information for the data being transferred to the tape units 22 and 21, respectively. Further details of clock apparatus suitable for inserting time information are shown and described in U.S. Pat. No. 3,818,456 and particularly in connection with FIG. 7 therein reference should be made to the oscillator 161 and the clock register 164. Additional details of clock apparatus suitable for use in the present invention are also shown and described in connection with FIG. 2 of the above-identified cross-referenced application REDUNDANT DATA TRANSMISSION SYSTEM.

By including clock apparatus within the output and control unit 14 of FIG. 1, the time information for all of the subscriber units associated with the FIG. 1 apparatus is provided from a centralized location.

While the invention has been particularly shown and described with reference to preferred embodiments thereof it will be understood by those skilled in the art that various changes in form and details may be made therein without departing from the spirit and the scope of the invention.

What is claimed is:

1. A message metering apparatus for metering the usage of a telephone system by a plurality of subscriber units and for transmitting data indicating usage between a first office and a remote second office comprising, in a first office,
means for generating signals to provide data indicating usage of the telephone system by each of said subscriber units,
memory means for storing said data,
data link means for transferring said data from said first office to a second office,
first control means for controlling transfer of said data from said memory means over said data link means, in a second office,
data receiver means for storing said data transferred over said data link means,
data path means for tranferring said data,
storage means for storing said data transferred over said data path means,
second control means for controlling transfer of said data from said data receiver means over said data path means.

2. The apparatus of claim 1 wherein said data link means includes first and second redundant channels for transferring said data and wherein said first control means includes control network means for activating one of said channels.

3. The apparatus of claim 2 wherein said control network means includes first and second control networks for enabling one at a time said first and second redundant channels, respectively.

4. The apparatus of claim 3 wherein said first and second control networks are responsive to first and second alarm signals, respectively, associated with said first and second redundant channels, respectively, and wherein said first and second control networks are each operative to force inactive an active on of said first and second redundant channels, respectively, in response to said first and second alarm signals, respectively.

5. The apparatus of claim 4 wherein each of said first and second alarm signals is produced in response to alarms of different priorities, said apparatus further including means for enabling one of said redundant channels active in response to an alarm associated with the other of said redundant channels providing that said other of said redundant channels does not have an alarm of a higher priority.

6. The apparatus of claim 1 wherein said data path means includes first and second redundant channels for transferring said data and wherein said second control means includes control network means for activating one of said channels.

7. The apparatus of claim 6 wherein said control network means includes first and second control networks for enabling one at a time said first and second redundant channels, respectively.

8. The apparatus of claim 7 wherein said first and second control networks are responsive to first and second alarm signals, respectively, associated with said first and second redundant channels, respectively, and wherein said first and second control networks are each operative to force inactive an active one of said first and second redundant channels, respectively, in response to said first and second alarm signals, respectively.

9. The apparatus of claim 8 wherein each of said first and second alarm signals is produced in response to alarms of different priorities, said apparatus further including means for enabling one of said redundant channels active in response to an alarm associated with the other of said redundant channels provided that said other of said redundant channels does not have an alarm of a higher priority.

10. The apparatus of claim 1 wherein said data link means includes first and second redundant data link channels, wherein said first control means includes first control network means for activating one of said data link channels, wherein said data path means includes first and second data path channels and wherein said second control means includes second control network means for activating one of said data path channels.

11. The apparatus of claim 10 wherein said first control network means includes first and second data link control networks for enabling one at a time said first and second data link channels, respectively.
and wherein said second control network means includes third and fourth control networks for enabling one at a time said first and second data path channels, respectively.

12. The apparatus of claim 11 wherein said first and second control networks are responsive to first and second alarm signals, respectively, associated with said first and second data link channels, respectively, and wherein said first and second control networks are each operative to force inactive an active one of said first and second data link channels, respectively, in response to said first and second alarm signals, respectively, and wherein said third and fourth control networks are responsive to third and fourth alarm signals, respectively, associated with said first and second data path channels, respectively, and wherein said third and fourth control networks are each operative to force inactive an active one of said first and second data path channels, respectively, in response to said third and fourth alarm signals, respectively.

13. The apparatus to claim 12 wherein each of said first and second alarm signals is produced in response to alarms of different priorities, said apparatus further including means for enabling one of said data link channels active in response to an alarm associated with the other of said data link channels provided that said other of said data link channels does not have an alarm of a higher priority, and wherein each of said third and fourth alarm signals is produced in response to alarms of different priorities, said apparatus further including means for enabling one of said data path channels active in response to an alarm associated with the other of said data path channels provided that said other of said data path channels does not have an alarm of a higher priority.

14. A message metering apparatus for metering the usage of a telephone system by a plurality of subscriber units comprising,
means for generating signals to provide data indicating usage of the telephone system by each of said subscriber units,
memory means for storing said data,
data link means for transferring said data,
first control means for controlling transfer of said data from said memory means over said data link means,
data path means for transferring said data,
storage means for storing said data transferred over said data path means,
second control means for controlling transfer of said data from said data receiver means over said data path means,
said memory means including a second data receiver and said apparatus including a remote metering apparatus for metering the usage of the telephone system by a plurality of remote subscriber units wherein the remote metering apparatus comprises,
remote means for generating signals to provide remote data indicating usage of the telephone system by each of said remote subscriber units,
remote memory means for storing said remote data,
remote data link means for transferring said remote data from said remote memory means to said second data receiver,
remote first control means for controlling the transfer of said remote data from said remote memory means to said second data receiver.

15. The apparatus of claim 14 wherein in said remote data link means includes first and second redundant channels for transferring said remote data and wherein said remote first control means includes remote control network means for activating one of said channels.

16. The apparatus of claim 15 wherein said remote control network means includes first and second remote control networks for enabling one at a time said first and second redundant channels, respectively.

17. The apparatus of claim 16 wherein said first and second remote control networks are responsive to first and second alarm signals, respectively, associated with said first and second redundant channels, respectively, and wherein said first and second remote control networks are each operative to force inactive an active one of said first and second redundant channels, respectively, in response to said first and second alarm signals, respectively.

18. The apparatus of claim 17 wherein each of said first and second alarm signals is produced in response to alarms of different priorities, said apparatus further including means for enabling one of said redundant channels active in response to an alarm associated with the other of said redundant channels providing that said other of said redundant channels does not have an alarm of a higher priority.

19. A message metering apparatus for metering the usage of a telephone system by a plurality of subscriber units comprising,
 means for generating signals to provide data indicating usage of the telephone system by each of said subscriber units,
 memory means for storing said data, said memory means including a second data receiver,
 data link means for transferring said data,
 first control means for controlling transfer of said data from said memory means over said data link means,
 data receiver means for storing said data transferred over said data link means,
 data path means for tranferring said data, said data path means including first and second redundant data path channels for transferring said data,
 storage means for storing said data transferred over said data path means,
 second control means for controlling transfer of said data from said data receiver means over said data path means, said second control means including first and second control networks for enabling one at a time said first and second redundant data path channels, respectively, wherein said first and second control networks are responsive to first and second alarm signals, respectively, associated with said first and second redundant data path channels, respectively, and wherein said first and second control networks are each operative to force inactive an active one of said first and second redundant data path channels, respectively, in response to said first and second alarm signals, respectively,
 said apparatus including a remote metering apparatus for metering the use of the telephone system by a plurality of remote subscriber units wherein the remote metering apparatus comprises,
 remote means for generating signals to provide remote data indicating usage of the telephone system by each of said remote subscriber units,
 remote memory means for storing said remote data,
 remote data link means for transferring said remote data from said remote memory means to said second data receiver,
 remote first control means for controlling the transfer of said remote data from said remote memory means to said second data receiver.

20. The apparatus of claim 19 wherein said remote data link means includes first and second redundant data link channels for transferring said remote data and wherein said remote first control means includes first and second remote control networks for enabling one at a time said first and second redundant data link channels, respectively, wherein said first and second remote control networks are responsive to third and fourth alarm signals, respectively, associated with said first and second redundant data link channels, respectively, and wherein said first and second remote control networks are each operative to force inactive an active one of said first and second redundant data link channels, respectively, in response to said third and fourth alarm signals, respectively.

21. A message metering apparatus for metering the usage of a telephone system by a plurality of subscriber units comprising,
 means for generating signals to provide data indicating usage of the telephone system by each of said subscriber units,
 memory means for storing said data,
 data link means for transferring said data,
 first control means for conrolling transfer of said data from said memory means over said data link means, said first control means including means for detecting when said data has not been transferred over said data link means without error and including retransmit means for causing said data to be transferred over said data link means a pluraity of times when said data has not been transferred without error,
 data receiver means for storing said data transferred over said data link means,
 data path means for transferring said data,
 storage means for storing said data transferred over said data path means,
 second control means for controlling transfer of said data from said data receiver means over said data path means.

22. A message metering apparatus for metering the usage of a telephone system by a plurality of subscriber units where said telephone system includes a plurality of switching exchanges for interconnecting subscriber units, said apparatus comprising,
 means associated with each of said switching exchanges for generating signals to provide data indicating usage of the telephone system by each of said subscriber units,
 memory associated with each of said switching exchanges for storing said data,
 data link means for transferring said data, from a first one to a second one of said switching exchanges,
 first control means for controlling transfer of said data from said memory means over said data link means,
 data receiver means for storing said data transferred over said data link means,
 data path means for transferring, said data,
 storage means for storing said data transferred over said data path means,
 second control means for controlling transfer of said data from said data receiver means over said data path means.

23. A message metering apparatus for metering the usage of a telephone system by a plurality of subscriber units where said telephone system includes a plurality of switching exchanges for interconnecting subscriber units, said apparatus comprising,
 means associated with each of said switching exchanges for generating signals to provide data indicating usage of the telephone system by each of said subscriber units, memory means associated with each of said switching exchanges for storing said data and including first data receiver means, data link means for transferring said data, first control means for controlling transfer of said data from said memory means over said data link means, second data receiver means for storing said data transferred over said data link means, data path means for transferring said data and including first and second redundant data path channels for transferring said data, storage means for storing said data transferred over said data path means, second control means for controlling transfer of said data from said second data receiver means over said data path means, said second control means including means for generating first and second alarm signals for indicating the alarm status of said first and second redundant data path channels, respectively, said second control means including first and second control networks for enabling one at a time said first and second redundant data path channels, respectively, wherein said first and second control networks are responsive to said first and second alarm signals, respectively, and wherein said first and second control networks each include means to force inactive an active one of said first and second redundant data path channels, respectively, in response to said first and second alarm signals, respectively, remote metering apparatus for metering the use of the telephone system by a plurality of remote subscriber units wherein the remote metering apparatus comprises, remote means for generating signals to provide remote data indicating usage of the telephone system by each of said remote subscriber units, remote memory means for storing said remote data, remote data link means for transferring said remote data from said remote memory means to said first data receiver means, remote first control means for controlling the transfer of said remote data from said remote memory means to said first data receiver means.

24. A message metering apparatus for metering the usage of a telephone system by a plurality of subscriber units and for transmitting data indicating usage between a first office and a remote second office comprising, in a first office,
means for generating signals to provide data indicating usage of the telephone system by each of said subscriber units,
memory means for storing said data,
data link means for transferring said data from said first office to a second office, in a second office,
data receiver means for storing said data transferred over said data link means,
data path means for transferring said data,
storage means for storing said data transferred over said data path means,
second control means for controlling transfer of said data from said data receiver means over said data path means, said second control means including clock means for providing a time data field to said data for indicating the time of usage of the telephone system by said subscriber units.

25. A message metering apparatus for metering the usage of a telephone system by a plurality of subscriber units where said telephone system includes a plurality of switching exchanges for interconnecting subscriber units, said apparatus comprising, means associated with each of said switching exchanges for generating signals to provide data indicating usage of the telephone system by each of said subscriber units, memory means associated with each of said switching exchanges for storing said data and including first data receiver means, data link means for transferring said data, first control means for controlling transfer of said data from said memory means over said data link means, second data receiver means for storing said data transferred over said data link means, data path means for transferring said data and including first and second redundant data path channels for transferring said data, storage means for storing said data transferred over said data path means, second control means for controlling transfer of said data from said second data receiver means over said data path means, said second control means for generating first and second alarm signals for indicating the alarm status of said first and second redundant data path channels, respectively, said second control means including first and second control networks for enabling one at a time said first and second redundant data path channels, respectively, wherein said first and second control networks are responsive to said first and second alarm signals, respectively, and wherein said first and second control networks each include means to force inactive an active one of said first and second redundant data path channels, respectively, in response to said first and second alarm signals, respectively, remote metering apparatus for metering the use of the telephone system by a plurality of remote subscriber units wherein the remote metering apparatus comprises, remote means for generating signals to provide remote data indicating usage of the telephone system by each of said remote subscriber units, remote memory means for storing said remote data, remote data link means for transferring said remote data from said remote memory means to said first data receiver means, remote first control means for controlling the transfer of said remote data from said remote memory means to said first data receiver means, calendar clock means connected to said second control means for providing a time field to said data transferred over said data path means whereby the time of usage of the telephone system by said subscriber units and said remote subscriber units is recorded.

* * * * *

UNITED STATES PATENT AND TRADEMARK OFFICE
CERTIFICATE OF CORRECTION

PATENT NO. : 4,001,509
DATED : January 4, 1977
INVENTOR(S) : John C. McDonald, et al It is certified that error appears in the above-identified patent and that said Letters Patent are hereby corrected as shown below:

Claim 4, Column 21, line 6, between "active" and "of", delete "on" and substitute therefor -- one --.

Claim 12, Column 21, line 68, delete "." and substitute therefor -- , --.

Claim 13, Column 22, line 10, between "apparatus" and "claim", delete "to" and substitute therefor -- of --.

Claim 15, Column 22, line 57, between "wherein" and "said", delete -- in --.

Claim 22, Column 24, line 43, between "memory" and "associated", insert therefor -- means --.

Claim 25, Column 26, line 30, after "control means", insert therefor -- including means --.

Signed and Sealed this

Twenty-ninth Day of March 1977

[SEAL]

Attest:

RUTH C. MASON
Attesting Officer

C. MARSHALL DANN
Commissioner of Patents and Trademarks